United States Patent

Kawaguchi et al.

[11] Patent Number: 6,036,447
[45] Date of Patent: Mar. 14, 2000

[54] CONTROL VALVE HAVING A GROUND CONNECTION FOR THE ACTUATOR COIL

[75] Inventors: Masahiro Kawaguchi; Tetsuhiko Fukanuma; Masanori Sonobe; Ken Suito, all of Kariya; Norio Uemura; Kazuaki Nagayoshi, both of Fujisawa; Ichiro Hirata, Sagamihara; Kouji Watanabe, Kamakura, all of Japan

[73] Assignee: Kabushiki Kaisha Toyoda Jidoshokki Seisakusho, Aichi-ken, Japan

[21] Appl. No.: 09/078,237

[22] Filed: May 13, 1998

[30] Foreign Application Priority Data

May 14, 1997 [JP] Japan ..................... 9-124177

[51] Int. Cl.[7] .................................................. F04B 1/26
[52] U.S. Cl. ................. 417/222.2; 251/129.02; 251/129.15; 335/28; 439/92
[58] Field of Search ................... 471/222.2; 251/129.07, 251/129.15, 61.6; 335/255; 439/92, 100, 101, 108

[56] References Cited

U.S. PATENT DOCUMENTS

| | | | |
|---|---|---|---|
| 3,306,570 | 2/1967 | Cooksley | 251/30 |
| 5,145,326 | 9/1992 | Kimura et al. | 417/222.2 |
| 5,842,835 | 12/1998 | Kawaguchi et al. | 417/222.2 |
| 5,890,876 | 4/1999 | Suito et al. | 417/222.2 |
| 5,964,578 | 10/1999 | Suito et al. | 417/222.2 |

FOREIGN PATENT DOCUMENTS 1-177466  7/1989  Japan .

*Primary Examiner*—Charles G. Freay
*Attorney, Agent, or Firm*—Morgan & Finnegan, L.L.P.

[57] ABSTRACT

A control valve used in a variable displacement compressor. A valve chamber port communicates with a valve chamber. A port is connected with the valve chamber by a valve hole. A valve body selectively opens and closes the valve hole for controlling flow of fluid between the ports. An actuator actuates the valve body. A coil bobbin is accommodated in the casing. A coil is wound about the bobbin. The bobbin contacts a first connector plate. A ground lead of the coil is connected to the first connector plate. A terminal is connected to a supply lead of the coil. A second connector plate is attached to a lid. The second connector plate faces the first connector plate. Flexible contacts are located between the first connector plate and the second connector plate to electrically connect the connector plates.

18 Claims, 8 Drawing Sheets

CONTROL VALVE HAVING A GROUND CONNECTION FOR THE ACTUATOR COIL

BACKGROUND OF THE INVENTION

The present invention relates to control valves. More particularly, the present invention pertains to a displacement control valve in a variable displacement compressor employed in a vehicle air conditioner.

A typical automobile has a compressor that varies the temperature of the passenger compartment for making the ride comfortable for passengers. Such compressors include a variable displacement compressor having a swash plate. The swash plate is tiltably supported on a drive shaft of the compressor. The inclination of the swash plate is changed in accordance with the difference between the pressure in a crank chamber and the suction pressure of the compressor. Rotation of the swash plate is converted into linear reciprocation of pistons.

Such a compressor includes a control valve for controlling the displacement of the compressor. The valve adjusts the pressure in the crank chamber and the suction pressure for controlling the refrigeration performance of the compressor.

Japanese Unexamined Patent Publication No. 1-177466 discloses such a control valve. This valve includes a housing and a solenoid coil secured to each other. The valve also has a valve body and a valve hole. The valve body is moved by the solenoid coil thereby changing the opening amount of the valve hole. Specifically, the valve body is moved by changing the magnitude of current supplied to the solenoid coil. The opening of the valve hole is adjusted, moved by changing the magnitude of current supplied to the solenoid coil. The opening of the valve hole is adjusted, accordingly. A supply lead wire is connected to one end of the solenoid coil and a ground lead wire is connected to the other end of the solenoid coil. The lead wires extend from the control valve. A connector is attached to the end of the supply lead wire. The connector couples the supply lead wire to an electrical power source. The end of the ground lead wire is connected to a fastener such as a ground clamp. The ground lead wire is grounded, or electrically connected to the body frame of a vehicle, by the fastener. In other words, an extra device such as a ground clamp is required for ground the ground lead wire. This increases the number of parts and thus raises costs.

SUMMARY OF THE INVENTION

Accordingly, it is an objective of the present invention to provide a control valve that grounds the ground lead of a solenoid coil without using a fastener such as a ground clamp thereby lowering the manufacturing cost.

To achieve the foregoing and other objectives and in accordance with the purpose of the present invention, a control valve is provided. The control valve includes a valve housing, a valve chamber within the housing and a valve body located in the valve chamber. The control valve controls a flow of fluid through the valve chamber by selectively opening and closing the valve hole with the valve body. The control valve also includes an actuator that is attached to the valve housing to actuate the valve body. The actuator includes a casing, which is electrically connected with the valve housing. The control valve further includes a bobbin, a coil, first and second connector plate, an electricity supply terminal and flexible contacts. The bobbin is made of an electrical insulating material and is accommodated in the casing. The coil is wound about the bobbin and has a ground end and a supply end. The first connector plate is located in close proximity to the bobbin. The ground end of the coil is connected to the first connector plate. The electricity supply terminal is formed in the casing. The supply end of the coil is connected to the supply terminal. The second connector plate faces and is spaced apart from the first connector plate. The second connector plate is electrically connected to the casing. The flexible contacts are located between the first connector plate and the second connector plate to electrically connect the connector plates. The contacts are secured to one of the first and second connector plates and contact the other connector plate.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
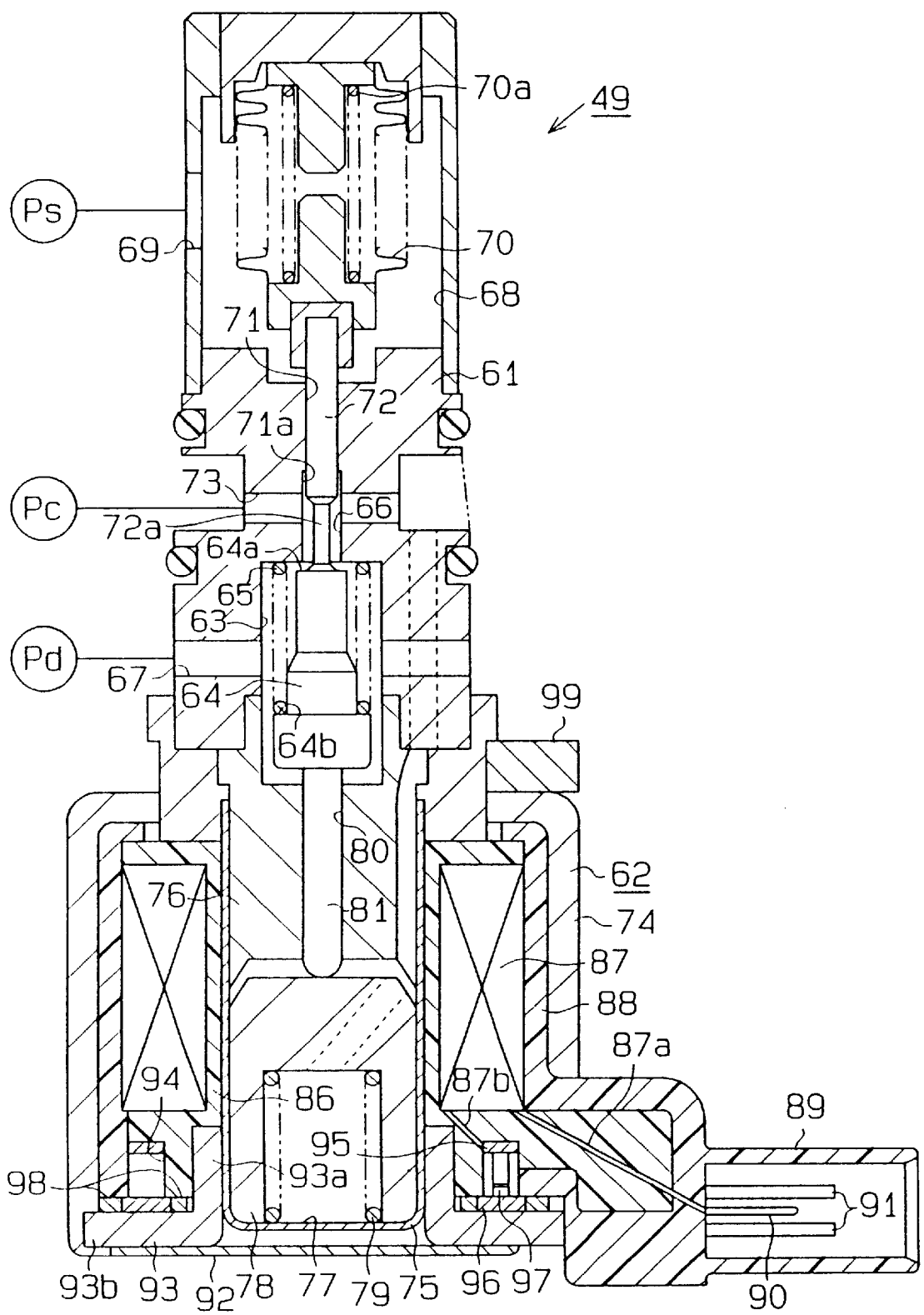
FIG. 1 is a cross-sectional view illustrating a control valve according to a first embodiment of the present invention.

A first embodiment of the present invention will now be described with reference to FIGS. 1–7.

First, a clutchless type variable displacement compressor will be described with reference to FIG. 2. A front housing 12 is secured to the front end face of a cylinder block 11. A rear housing 13 is secured to the rear end face of the cylinder block 11, and a valve plate 14 is located between the rear housing 13 and the end face. A crank chamber 15 is defined by the inner walls of the front housing 12 and the front end face of the cylinder block 11. A shaft 16 is rotatably supported in the front housing 11 and the cylinder block 12 and extends through the crank chamber 15.

The front housing 12 has a cylindrical wall extending forward. The front end of the drive shaft 16 is located in the cylindrical wall and is secured to a pulley 17. The pulley 17 is rotatably supported by the cylindrical wall with an angular bearing 19. The pulley 17 is directly coupled to an external drive source, or a vehicle engine (not shown), by a belt 18. The angular bearing 19 transfers thrust and radial loads that act on the pulley 17 to the front housing 12.

A lip seal 20 is located between the shaft 16 and the front housing 12 for sealing the crank chamber 15. That is, the lip seal 20 prevents refrigerant gas in the crank chamber A rotor 21 is fixed to the drive shaft 16 in the crank chamber 15. A cam plate, or swash plate 22, is supported by the shaft 16 in the crank chamber 15 to slide along and to tilt with respect to the axis of the shaft 16. A pair of guiding pins 23 are fixed to the swash plate 22. Each guiding pin 23 has a guide ball at its distal end. The rotor 21 has a support arm 24. A pair of guide holes 25 are formed in the support arm 24. Each guide pin 23 is slidably fitted into the corresponding guide hole 25. The cooperation of the arm 24 and the guide pins 23 permits the swash plate 22 to rotate integrally with the shaft 16. The cooperation also guides the tilting of the swash plate 22 along the axis of the shaft 16.

As the center of the swash plate 22 moves toward the cylinder block 11, the inclination of the swash plate 22 decreases. A spring 26 extends between the rotor 21 and the swash plate 22. The spring 26 urges the swash plate 22 in the direction that decreases the inclination of the swash plate 22. The rotor 21 has a projection 21a on its rear end face. Abutment of the swash plate 22 against the projection 21a limits the maximum inclination of the swash plate 22.

Figure 2:
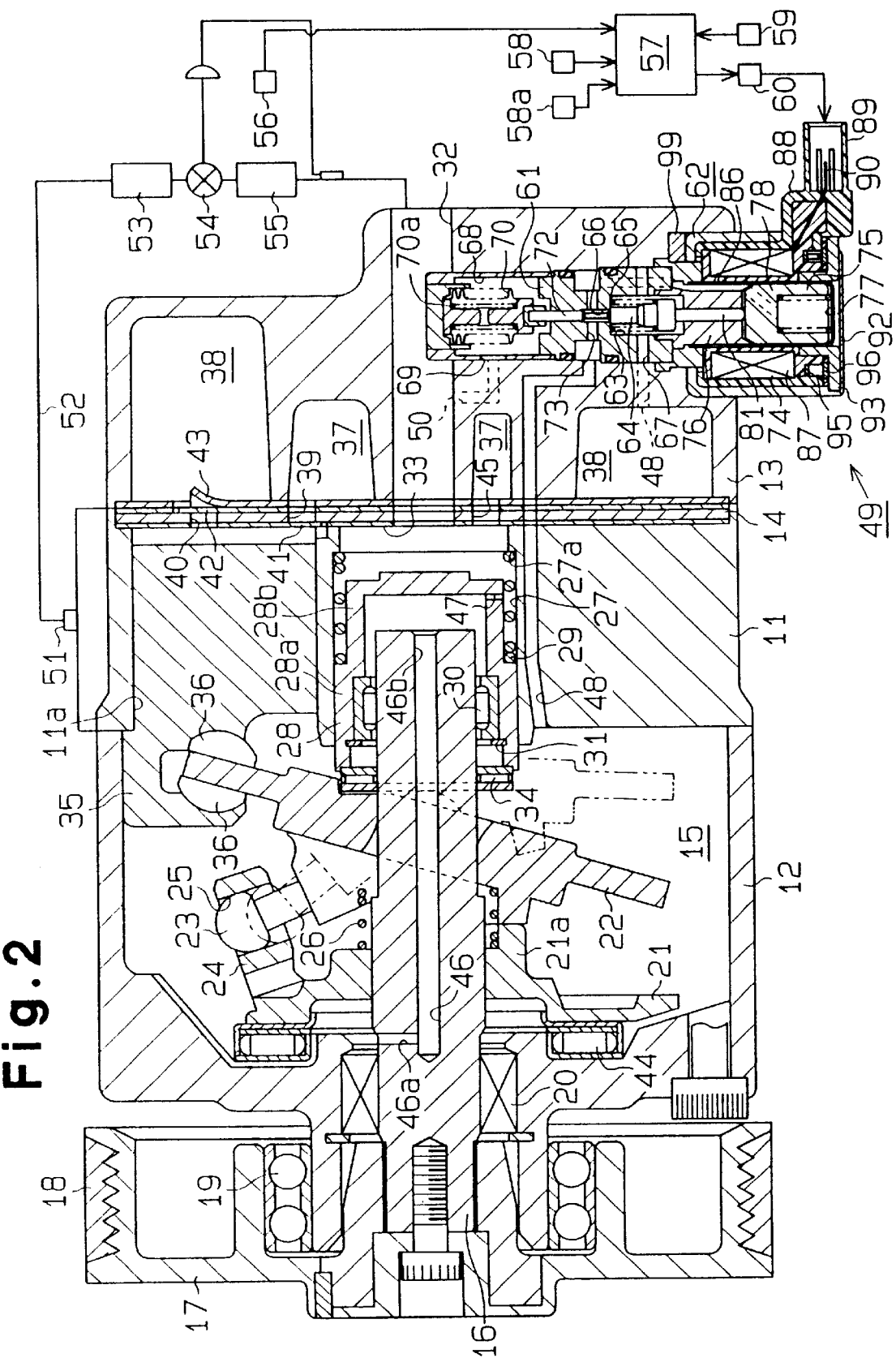
FIG. 2 is a cross-sectional view illustrating a clutchless type variable displacement compressor having the electromagnetic valve of FIG. 1.
Figure 3:
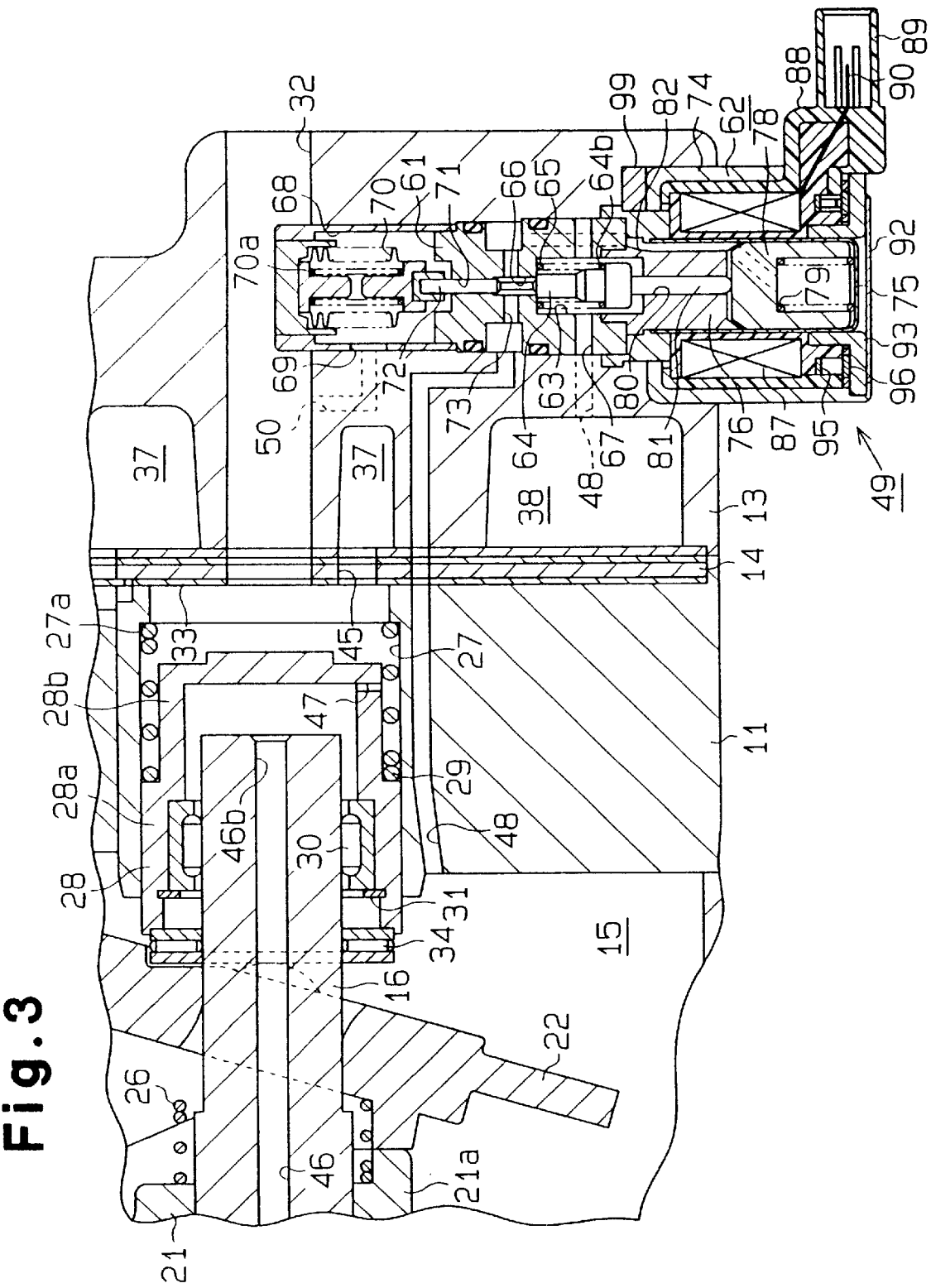
FIG. 3 is an enlarged partial cross-sectional view illustrating the compressor of FIG. 2 when the inclination of the swash plate is maximum.
Figure 4:
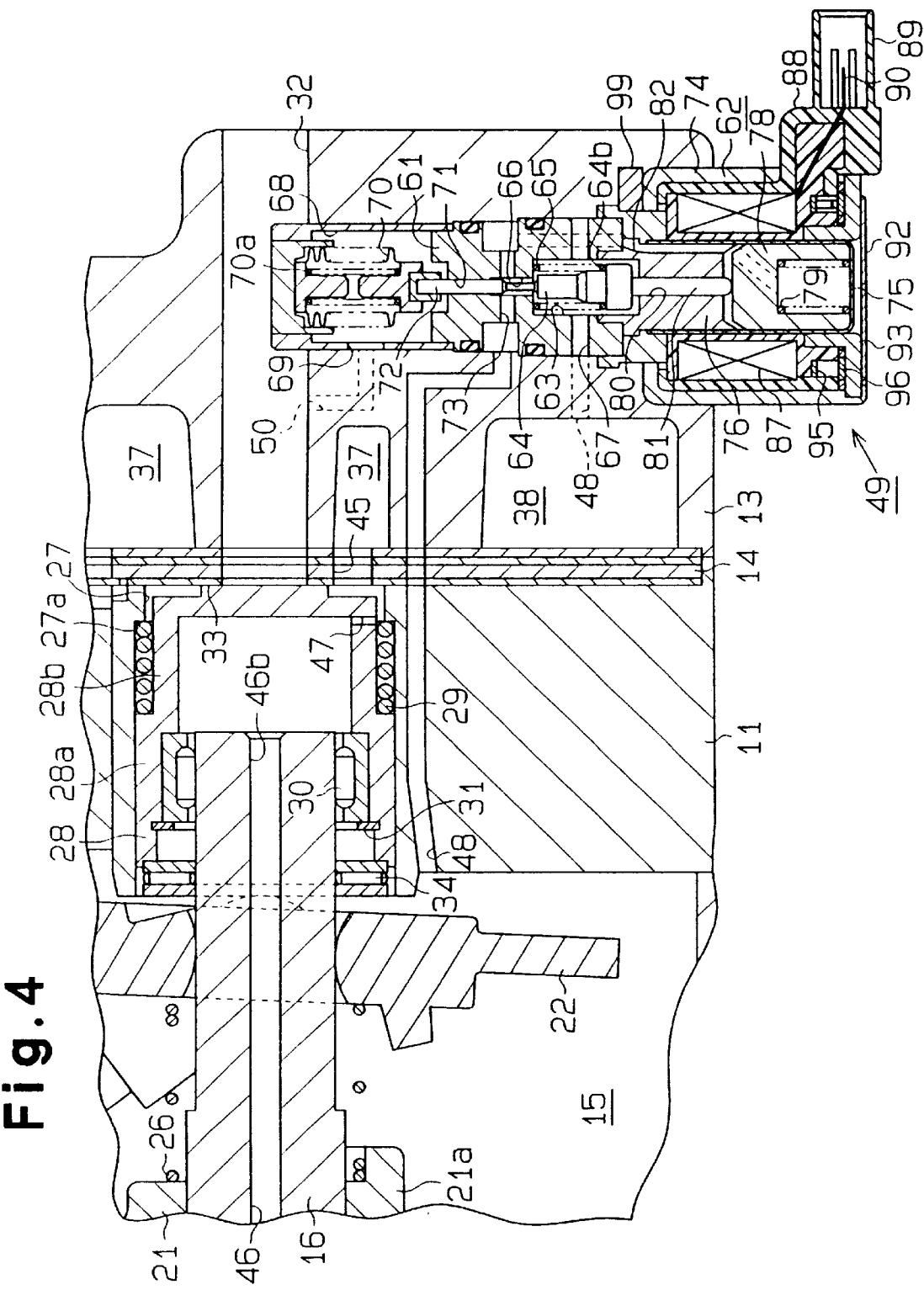
FIG. 4 is an enlarged partial cross-sectional view illustrating the compressor of FIG. 2 when the inclination of the swash plate is minimum.

As shown in FIGS. 2 to 4, the cylinder block 11 has a shutter chamber 27 at its center portion. The shutter chamber 27 extends along the axis of the drive shaft 16. A cup-shaped shutter 28 is slidably accommodated in the shutter chamber 27. The shutter 28 has a large diameter portion 28a and a small diameter portion 28b. A spring 29 is located between a step 27a formed in the shutter chamber 27 and a step, or a shoulder, which is formed between the large diameter portion 28a and the small diameter portion 28b. The coil spring 29 urges the shutter 28 in a direction to open a suction passage 32. The spring 29 urges the shutter 28 toward the swash plate 22.

The rear end of the shaft 16 is inserted in the shutter 28. A radial bearing 30 is fixed to the inner wall of the large diameter portion 28a by a snap ring 31. The rear end of the drive shaft 16 is slidably supported by the inner wall of the shutter chamber 27 with the radial bearing 30 and the shutter 28 in between.

The suction passage 32 is defined in the center of the rear housing 13 and the valve plate 14. The axis of the passage 32 is aligned with the axis of the drive shaft 16. The suction passage 32 communicates with the shutter chamber 27. A positioning surface 33 is formed on the valve plate 14 about the inner opening of the suction passage 32. The rear end of the shutter's small diameter portion 28b abuts against the positioning surface 33. The abutment limits rearward movement of the shutter 28.

A thrust bearing 34 is supported on the drive shaft 16 and is located between the swash plate 22 and the shutter 28. The thrust bearing 34 slides along the axis of the drive shaft 16. The force of the spring 29 constantly retains the thrust bearing 34 between the swash plate 22 and the large diameter portion 28a of the shutter 28.

When the swash plate 22 inclines toward the shutter 28, the movement of the swash plate 22 is transmitted to the shutter 28 through the thrust bearing 34. Accordingly, the shutter 28 moves toward the positioning surface 33 while contracting the spring 29. Consequently, the shutter 28 contacts the positioning surface 33. The thrust bearing 34 prevents rotation of the swash plate 22 from being transmitted to the shutter 28.

As shown in FIG. 2, the cylinder block 11 has cylinder bores 11a extending therethrough. Each cylinder bore 11a houses a single-headed piston 35. The rotating movement of the swash plate 22 is transmitted to each piston 35 through a pair of shoes 36 and is converted to linear reciprocation of the piston 35 in the associated cylinder bore 11a.

An annular suction chamber 37 and an annular discharge chamber 38 are defined in the rear housing 13. The valve plate 14 has suction ports 39 and discharge port 40. The valve plate 14 also has suction valve flaps 41 and discharge valve flaps 42. Each suction valve flap 41 corresponds to one of the suction ports 39 and each discharge valve flap 42 corresponds to one of the discharge ports 40. As each piston 35 moves from the top dead center to the bottom dead center in the associated cylinder bore 11a, refrigerant gas in the suction chamber 37 enters the cylinder bore 11a through the associated suction port 39 while causing the associated valve flap 41 to flex to an open position. As each piston 35 moves from the bottom dead center to the top dead center in the associated cylinder bore 11a, the gas in the cylinder bores 11a is compressed to a predetermined pressure. The gas is then discharged to the discharge chamber 38 through the associated discharge port 40 while causing the associated valve flap 42 to flex to an open position. The opening amount of each discharge valve flap 42 is defined by contact between the valve flap 42 and an associated retainer 43.

Gas compression in the cylinder bores 11 generates reactive force. The reactive force is transmitted to the rotor 21 through the pistons 35, the shoes 36, the swash plate 22 and the guide pins 23. A thrust bearing 44, which is located between the front housing 12 and the lug plate 21, carries the reactive force transmitted to the rotor 21.

As shown in FIGS. 2 to 4, the suction chamber 37 is connected with the shutter chamber 27 by a hole 45. When contacting the positioning surface 33, the shutter 28 closes the front opening of the suction passage 32 thereby disconnecting the hole 45 from the suction passage 32. The shaft 16 has an axial passage 46. The passage 46 has an inlet 46a and an outlet 46b. The inlet 46a opens to the crank chamber 15 in the vicinity of the lip seal 20 and the outlet 46b opens to the interior of the shutter 28. The interior of the shutter 28 is connected with the shutter chamber 27 by a pressure release hole 47, which is formed in the shutter wall near the rear end of the shutter 28.

The discharge chamber 38 is connected with the crank chamber 15 by a supply passage 48. The supply passage 48 is regulated by a displacement control valve 49, which is accommodated in the rear housing 13. The control valve 49 is connected with the suction passage 32 by a pressure introduction passage 50. The passage 50 introduces suction pressure Ps to the control valve 49 from the suction passage 32. The control valve 49 includes an electromagnetic actuator 62 having a solenoid coil 87.

An outlet 51 is formed in the upper portion of the cylinder block 11. Refrigerant gas in the discharge chamber 38 is discharged to a refrigerant circuit 52 through the outlet 51. The outlet 51 is connected with the suction passage 32, which introduces refrigerant gas to the suction chamber 37, by the refrigerant circuit 52. The refrigerant circuit 52 includes a condenser 53, an expansion valve 54 and an evaporator 55. A temperature sensor 56 is located in the vicinity of the evaporator 55. The temperature sensor 56 detects the temperature of the evaporator 55 and issues signals relating to the detected temperature to a computer 57. The computer 57 is also connected to a temperature adjuster 58, a compartment temperature sensor 58a and an air conditioner starting switch 59. A passenger sets a desirable compartment temperature by the temperature adjuster 58.

The computer 57 receives various information including, for example, a target temperature set by the temperature adjuster 58, the temperature detected by the temperature sensor 56, the passenger compartment temperature detected by the temperature sensor 58a, an ON/OFF signal from the starting switch 59, the external temperature and the engine speed. Based on this information, the computer 57 computes the value of a current supplied to the solenoid coil 87 in the actuator 62 and transmits the computed current value to a driver 60. Accordingly, the driver 60 sends a current having the computed value to the solenoid coil 87 for actuating the actuator 62.

As shown in FIGS. 1 and 2, the control valve 49 includes a housing 61 and the actuator 62. The housing 61 and the actuator 62 are secured to each other at the center of the valve 49. A valve chamber 63 is defined between the housing 61 and the actuator 62. The valve chamber 63 accommodates a valve body 64. The housing 61 also has a valve hole 66 extending along its axis. The lower opening of the valve hole 66 communicates with the valve chamber 63 and faces the valve body 64. An opening spring 65 extends between a step 64b on the valve body 64 and a wall of the valve chamber 63. The spring 65 urges the valve body 64 in a direction opening the valve hole 66. The valve chamber 63 is connected with the discharge chamber 38 by a valve chamber port 67 and the supply passage 48.

A pressure sensing chamber 68 is defined in the upper portion of the housing 61 as viewed in the drawings. The words upper, lower and the like in the following description refer to upper locations and lower locations as viewed in the drawings. The sensing chamber 68 is connected with the suction passage 32 by a pressure introduction port 69 and the pressure introduction passage 50.

A bellows 70 is housed in the sensing chamber 68. The bellows 70 includes a spring 70a. The spring 70a expands the bellows 70 toward the valve hole 66. A guide hole 71 is formed in the housing 61 to connect the sensing chamber 68 with the valve chamber 63. The diameter of the guide hole 71 is slightly smaller than that of the valve hole 66.

The guide hole 71 slidably accommodates a pressure sensing rod 72. The rod 72 couples the bellows 70 with the valve body 64. The rod 72 has a small diameter portion 72a, which extends within the valve hole 66 and is coupled to the valve body 64. The clearance between the small diameter portion 72a and the valve hole 66 permits the flow of refrigerant gas.

A port 73 is formed in the housing 61 between the valve chamber 63 and the pressure sensing chamber 68. The port 73 extends radially and intersects the valve hole 66. The port 73 is connected with the crank chamber 15 by the supply passage 48.

The actuator 60 includes a cylindrical outer casing 74 and a cup-shaped plunger casing 75. The casings 74, 75 are made of metal. A fixed iron core 76 is fitted to the upper opening of the plunger casing 75. The fixed core 76 defines a plunger chamber 77 in the plunger casing 75. An inverted cup-shaped plunger 78 is reciprocally housed in the plunger chamber 77. A follower spring 79 extends between the plunger 78 and the bottom of the plunger casing 75. The urging force of the spring 79 is smaller than that of the spring 65.

The fixed core 76 has a guide hole 80 extending between the plunger chamber 77 and the valve chamber 63. A solenoid rod 81 is formed integrally with the valve body 64.

The rod 81 extends through and slides with respect to the guide hole 80. The springs 65 and 79 cause the lower end of the rod 81 to contact the plunger 78. In other words, the valve body 64 moves integrally with the plunger 78 with the rod 81 in between.

Figure 5:
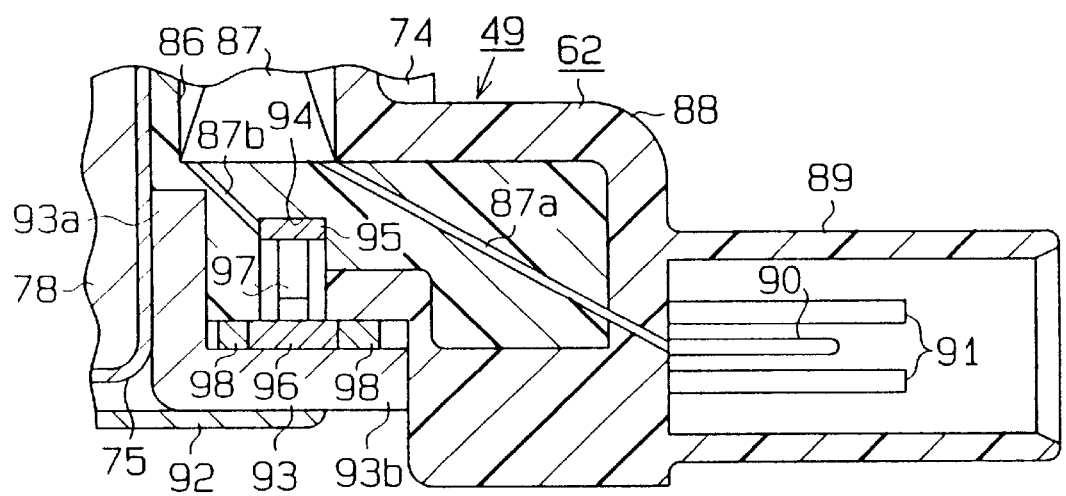
FIG. 5 is an enlarged partial cross-sectional view illustrating the control valve of FIG. 1.
Figure 6:
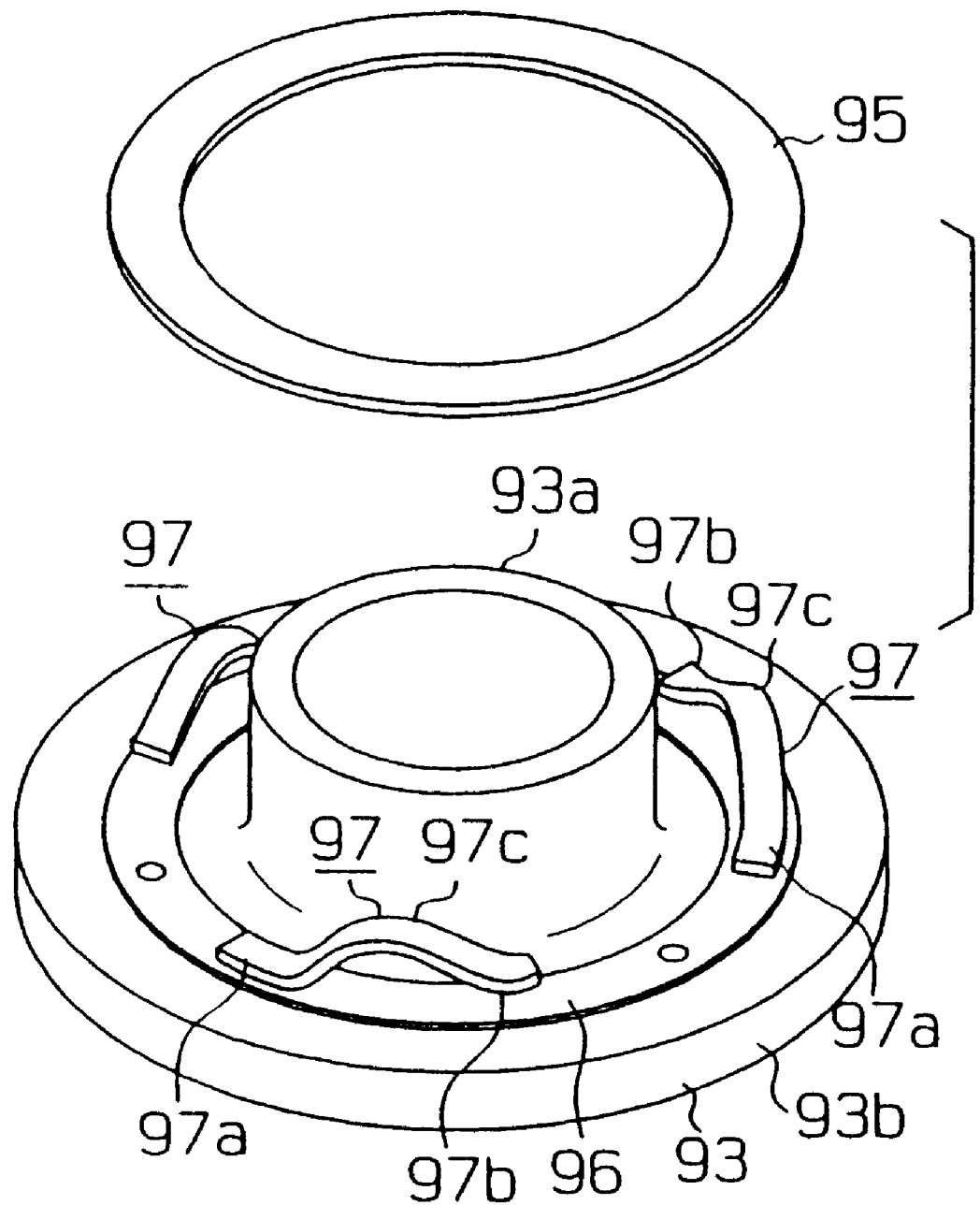
FIG. 6 is an exploded perspective view illustrating a pair of connector plates.

As shown in FIGS. 1, 5 and 6, a coil bobbin 86 surrounds the plunger casing 75. The bobbin 86 is made of insulating material. A coil 87 is wound about the bobbin 86. An insulating cover 88 surrounds the bobbin 86 and the coil 87. A socket 89 extends from the lower periphery of the cover 88. A terminal 90 and a pair of connector guides 91 extend from the bottom surface of the socket 89. A supply lead 87a of the coil 87 extends through the bobbin 86 and the cover 88 and is connected with the terminal 90. Electricity is supplied to the coil 87 through the terminal 90 and the lead line 87a.

A metal lid 92 is fitted to the lower opening of the outer casing 74. A cylindrical metal base 93 is welded to the inner side of the lid 92. The base 93 includes a flange 93b and a cylindrical wall 93a extending upward from the center of the flange 93b. The plunger casing 75 is fitted to the cylindrical wall 93a. The lower end of the outer casing 74 is crimped to the circumference of the flange 93b. An annular recess 94 is formed in the lower surface of the bobbin 86. An annular first connector plate 95 made of metal is located within and fixed to the 94. A ground lead 87b of the coil 87 extends through the bobbin 86 to the recess 94 and is connected to the first connector plate 95.

Figure 7A:
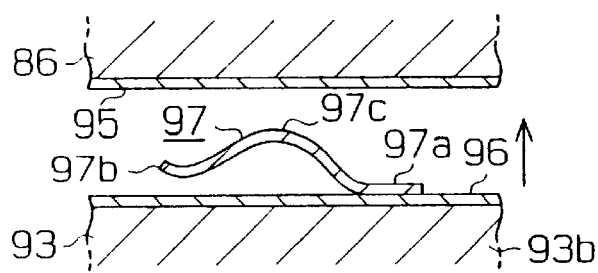
FIGS. 7(a) and 7(b) are enlarged partial cross-sectional views illustrating connector plates of FIG. 6.

An annular second connector plate 96 made of metal is soldered or welded to the inner side of the flange 93b. Flexible metal contacts 97, the number of which is three in this embodiment, are fixed to the upper side of the second connector plate 96. As seen in FIG. 7(a), each contact 97 has a cross sectional shape like that of a bell or an inverted dish. Specifically, proximal ends 97a of the contacts 97 are soldered or welded to the second connector plate 96 as seen best in FIG. 6. The contacts 97 are curved upward and are equally spaced apart. The surfaces of the connector plates 95, 96 and the contacts 97 are plated with silver or tin, both of which have stable electric resistance characteristics against temperature changes.

Figure 7B:
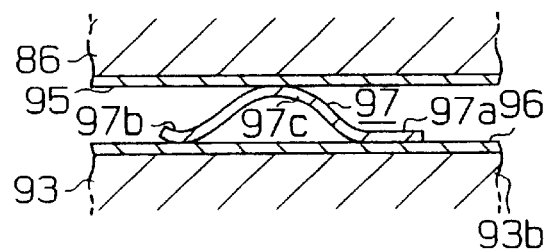

Before assembling the base 93 with the outer casing 74, a free end 97b of each contact 97 is spaced apart from the second connector plate 96 by a predetermined distance as shown in FIG. 7(a). A middle portion 97c of each contact 97 is pressed against the first connector plate 95 when the base 93 is attached to the lower opening of the casing 74. In this state, each contact 97 is elastically deformed and the free end 97b of each contact 97 contacts the second connector plate 96 as shown in FIG. 7(b). The ground lead 87b of the coil 87 is electrically connected with the valve housing 61 through the first connector plate 95, the contacts 97, the second connector plate 96, the base 93, the lid 92 and the outer casing 74.

As shown in FIGS. 1 and 5, a pair of annular gaskets 98 are located on the upper side of the flange 93b. The gaskets 98 are located radially inside and outside of the second connector plate 96, respectively. When the lid 92 and the base 93 are fixed to the lower end of the outer casing 74, the gaskets 98 contact the lower end of the bobbin 86. The gaskets 98 seal the interior of the outer casing 74 and protect the contacts 97 and the connector plate 95, 96.

As shown in FIGS. 1 and 2, a conductive metal bracket 99 protrudes from the valve housing 61. The control valve 49 is secured to the rear housing 13 of the compressor by the bracket 99. The bracket 99 electrically connects the valve housing 61 with the rear housing 13. Therefore, the ground lead 87b of the coil 87 is grounded, or electrically connected to the vehicle via the compressor. The terminal 90 is connected to the computer 57 by the driver 60. The driver 60 supplies current to the coil 87 based on commands from the computer 57.

The operation of the control valve 49 and the compressor having the valve 49 will now be described.

When the air conditioner starting switch 59 is on, if the compartment temperature is higher than a target temperature, the computer 57 commands the driver 60 to excite the actuator 62. Accordingly, the driver 60 actuates the coil 87 with electric current having a certain magnitude. This produces a magnetic attractive force between the fixed core 76 and the plunger 78 in accordance with the current magnitude. The attractive force is transmitted to the valve body 64 by the solenoid rod 81 and thus urges the valve body 64 against the force of the spring 65. As a result, the opening of the valve hole 66 is decreased.

The length of the bellows 70 varies in accordance with the suction pressure Ps that is introduced to the pressure sensing chamber 68. Changes in the length of the bellows 70 are transmitted to the valve body 64 by the pressure sensing rod 72. The opening area of the valve 49 is determined by the equilibrium position of the body 64, which is affected by the force of the actuator 62, the force of the bellows 70 and the force of the spring 65.

When the cooling load is great, the temperature in the passenger compartment detected by the sensor 58a is higher than a target temperature set by the temperature adjuster 58. The computer 57 controls the current value to the actuator 62 based on the difference between the detected temperature and the target temperature thereby changing a target value the suction pressure Ps. Particularly, the computer 57 commands the driver 60 to increase the magnitude of the current sent to the coil 87 as the compartment temperature increases. A higher current magnitude increases the attractive force between the fixed core 76 and the plunger 78 thereby increasing the resultant force that causes the valve body 64 to close the valve hole 66. Therefore, opening the valve 64 requires lower suction pressure Ps. Thus, increasing the current value to the actuator 62 causes the valve 49 to maintain lower suction pressure Ps.

A smaller opening amount of the valve hole 66 represents a decreased refrigerant gas flow from the discharge chamber 38 to the crank chamber 15 via the supply passage 48. The refrigerant gas in the crank chamber 15 flows into the suction chamber 37 via the axial passage 46, the interior of the shutter 28, the pressure release hole 47, the shutter chamber 27 and the hole 45. This lowers the pressure Pc in the crank chamber 15. Further, when the cooling load is great, the pressure in the cylinder bores 11a is high and the difference between the pressure Pc and the pressure in the cylinder bores 11a is small. This results in a greater inclination of the swash plate 22.

When the valve body 64 of the valve 49 completely closes the valve hole 66, highly pressurized gas in the discharge chamber 38 is not supplied to the crank chamber 15. Therefore, the pressure Pc in the crank chamber 15 becomes substantially equal to the pressure Ps in the suction chamber 37. This maximizes the inclination of the swash plate 22. The abutment of the swash plate 22 against the projection 21a of the rotor 21 limits the maximum inclination of the swash plate 22.

When the cooling load is small, the difference between the compartment temperature detected by the sensor 58a and a target temperature set by the temperature adjuster 58 is small. In this state, the computer 57 commands the driver 60 to decrease the magnitude of the current sent to the coil 87. A lower current magnitude decreases the attractive force between the fixed core 76 and the plunger 78 and thus decreases the resultant force that moves the valve body 64 in a direction closing the valve hole 66. As a result, the valve 64 operates at a higher suction pressure Ps. Thus, if the current value to the coil 87 is lowered, the valve 49 maintains a higher suction pressure Ps.

Enlarging the opening of the valve hole 66 increases the amount of refrigerant gas flow from the discharge chamber 38 to the crank chamber 15 thereby increasing the pressure Pc in the crank chamber 15. Further, when the cooling load is small, the pressure in the cylinder bores 11a is low. Therefore, the difference between the pressure Pc in the crank chamber 15 and the pressure in the cylinder bores 11a is great. As a result, the inclination of the swash plate 22 is decreased.

As the cooling load approaches zero, the temperature of the evaporator 55 drops to a frost forming temperature. When the temperature sensor 56 detects a temperature that is equal to or lower than the temperature set by the temperature adjuster 58, the computer 57 commands the driver 60 to de-excite the actuator 62. A compartment temperature that is equal to or lower than the target temperature represents a frost forming state of the evaporator 55. The driver 60 then stops sending current to the coil 87. This stops the magnetic attractive force between the fixed core 76 and the plunger 78.

The valve body 64 is then moved by the force of the spring 65 downward (as viewed in the drawings) against the force of the spring 79. This maximizes the opening area between the valve body 64 and the valve hole 66. Accordingly, a greater amount of highly pressurized gas in the discharge chamber 38 is supplied to the crank chamber 15 via the supply passage 48. This raises the pressure Pc in the crank chamber 15, thereby minimizing the inclination of the swash plate 22.

When the switch 59 is turned off, the computer 57 commands the driver 60 to de-excite the actuator 62. Accordingly, the inclination of the swash plate 22 is minimized.

As described above, the valve 49 is controlled in accordance with the magnitude of the current supplied to the coil 87 of the actuator 62. When the magnitude of the current is increased, the valve 49 opens and closes the valve hole 66 at a lower suction pressure Ps. When the magnitude of the current is decreased, on the other hand, the valve 49 opens and closes the valve hole 66 at a higher suction pressure Ps.

When the inclination of the swash plate 22 is minimum as illustrated in FIG. 4, the shutter 28 abuts against the positioning surface 33. The abutment disconnects the suction passage 32 from the shutter chamber 27 thereby stopping the flow of refrigerant gas from the refrigerant circuit 52 to the suction chamber 37. The swash plate 22 moves the shutter 28 between a closed position for disconnecting the suction passage 32 from the shutter chamber 27 and an open position for connecting the passage 32 with the chamber 27.

Since the minimum inclination of the swash plate 22 is more than zero degrees, refrigerant gas in the cylinder bores 11a is discharged to the discharge chamber 38 even if the inclination of the swash plate 22 is minimum. In this state, the refrigerant gas in the discharge chamber 38 enters the crank chamber 15 through the supply passage 48. The refrigerant gas in the crank chamber 15 is drawn back into the suction chamber 37 through the axial passage 46, the interior of the shutter 28 the pressure release hole 47, the shutter chamber 27 and the hole 45. The gas in the suction chamber 37 is drawn into the cylinder bores 11a and is again discharged to the discharge chamber 38.

That is, when the inclination of the swash plate 22 is minimum, refrigerant gas circulates within the compressor traveling through the discharge chamber 38, the supply passage 48, the crank chamber 15, the axial passage 46, the interior of the shutter 28, the pressure release hole 47, the shutter chamber 27, the hole 45, the suction chamber 37 and the cylinder bores 11a since the pressures in the discharge chamber 38, the crank chamber 15 and the suction chamber 37 are different. The circulation of refrigerant gas causes lubricant oil contained in the gas to lubricate the moving parts of the compressor.

When the switch 59 is on and the inclination of the swash plate 22 is minimum, an increase in the compartment temperature increases the cooling load and may result in the compartment temperature exceeding a target temperature. In this case, the computer 57 commands the driver 60 to excite the actuator 62 based on the detected temperature increase. The actuator 62 closes the supply passage 48 with the valve body 64. The pressure Pc in the crank chamber 15 is released to the suction chamber 37 through the axial passage 46, the interior of the shutter 28, the pressure release hole 47, the shutter chamber 27 and the hole 45. This lowers the pressure Pc. Accordingly, the spring 29 expands from the state of FIG. 4. That is, spring 29 moves the shutter 28 away from the positioning surface 33 and increases the inclination of the swash plate 22 from the minimum inclination.

If the engine is stopped, the compressor is also stopped, that is, the rotation of the swash plate 22 is stopped, and the supply of current to the coil 87 is stopped. Therefore, the actuator 62 is de-excited and opens the supply passage 48. If the nonoperational state of the compressor continues, the pressures in the chambers of the compressor equalize, and the swash plate 22 is kept at the minimum inclination by the force of spring 26. Therefore, when the engine is started again, the compressor starts operating with the swash plate 22 at the minimum inclination, which requires the minimum torque.

The insulating cover 88 surrounds the bobbin 86 and the coil 87 of the actuator 62, and the socket 89 extends outward from the periphery of the cover 88. The terminal 90 protrudes from the bottom surface of the socket 89. The supply lead 87a of the coil 87 is connected to the terminal 90. Electric current is supplied to the coil 87 through the terminal 90.

The bobbin 86 is housed in the outer casing 74. The base 93 and the lid 92 are attached to the lower opening of the casing 74. The first connector plate 95 is secured to the upper surface of the recess 94 (as viewed in FIG. 1), and the second connector plate 96 is secured to the flange 93b of the base 93. The flexible contacts 97 are secured to the second connector plate 96. The contacts 97 contact the first connector plate 95.

The ground lead 87b of the coil 87 is connected to the first connector plate 95. Thus, when the actuator 62 is secured to the valve housing 61, the ground lead 87b of the coil 87 is electrically connected with the valve housing 61 through the first connector plate 95, the contacts 97, the second connector plate 96, the base 93, the lid 92 and the outer casing 74.

When the valve housing 61 is installed in the rear housing 13 of the compressor, the valve housing 61 is electrically connected with the rear housing 13 by the bracket 99. Thus, the ground lead 87b of the coil 87 is grounded, or is electrically connected to the rear housing 13 through the valve housing 61 and the bracket 99. In the prior art, a supply lead wire and a ground lead wire of the coil extend from a control valve. The distal end of the supply lead wire is connected to the power supply by a connector and the distal end of the ground lead line is grounded, or connected to the vehicle body frame, by a fastener such as a ground clamp. Unlike the prior art, the control valve 49 illustrated in FIGS. 1–7 does not require a connector or a fastener formed independently from the valve 49.

The embodiment of FIGS. 1–7 has the following advantages.

The supply lead 87a of the coil 87 is connected to the terminal 90. The ground lead 87b of the coil 87 is connected to the valve housing 61 by the connector plates 95, 96, the flexible contacts 97 and the outer casing 74. Therefore, the ground lead 87b is easily grounded by simply assembling the control valve 49 to the rear housing 13. In other words, the valve 49 requires no fasteners such as a ground clamp for grounding the ground lead 87b of the coil 87. As a result, the manufacturing cost is decreased.

Operation of the compressor can change the temperature of the control valve 49. Since the bobbin 88 is made of insulating material and the outer casing 74 is made of metal, the coefficient of thermal expansion of the bobbin 88 is different from that of the casing 74. Thus, changes in the temperature of the valve 49 can alter the relative position of the bobbin 86 relative to the casing 74. However, such changes are absorbed by elastic deformation of the contacts 97. This causes the first connector plate 95 to be constantly and positively connected with the second connector plate 96.

Each contact 97 engages the second connector plate 96 at its proximal end 97a and its free end 97b. Also, the middle portion 97c of each contact 97 is pressed against the first connector plate 95. Therefore, the load acting on the middle portion 97c is transferred to the second connector plate 96 through the secured and free ends 97a, 97b. This prevents the contacts 97 from being damaged by the load acting thereon. The contacts 97 are deformed between the connector plates 95 and 96. The spring force generated by the deformation of the contacts 97 presses the middle portion 97c against the first connector plate 95. This causes the connector plates 95 and 96 to be securely connected with each other.

The valve housing 61 is electrically connected with the rear housing 13 of the compressor by the bracket 99. Therefore, the ground lead 87b of the coil 87 is easily grounded through the valve housing 61, the bracket 99 and the rear housing 13.

Three contacts 97 are secured to the second connector plate 96 and are equally spaced apart. Therefore, the first connector plate 95 is positively connected with the second connector plate 96 in a stable manner.

The connector plates 95, 96 are annular. Therefore, the angular positions of the connector plates 95, 96 relative to each other are freely determined. This facilitates the assembly of the actuator 62.

The gaskets 98 are located outside and inside of the second connector plate 96. The gaskets 98 contact the lower end of the bobbin 86 for sealing the interior of the outer casing 74 thereby preventing the connector plates 95, 96 and the contacts 97 from expure to water and moisture.

The surface of the connector plates 95, 96 and the contacts 97 are plated with silver or tin, both of which have stable electric resistance characteristics against temperature changes. Therefore, the electric resistance between the connector plate 95 and 96 is not increased by temperature changes. This extends the life of the valve 49.

A second embodiment of the present invention will now be described with reference to FIGS. 8–10. The differences from the first embodiment will mainly be discussed below, and like or the same reference numerals are given to those components that are like or the same as the corresponding components of the embodiment of FIGS. 1–7.

Figure 8:
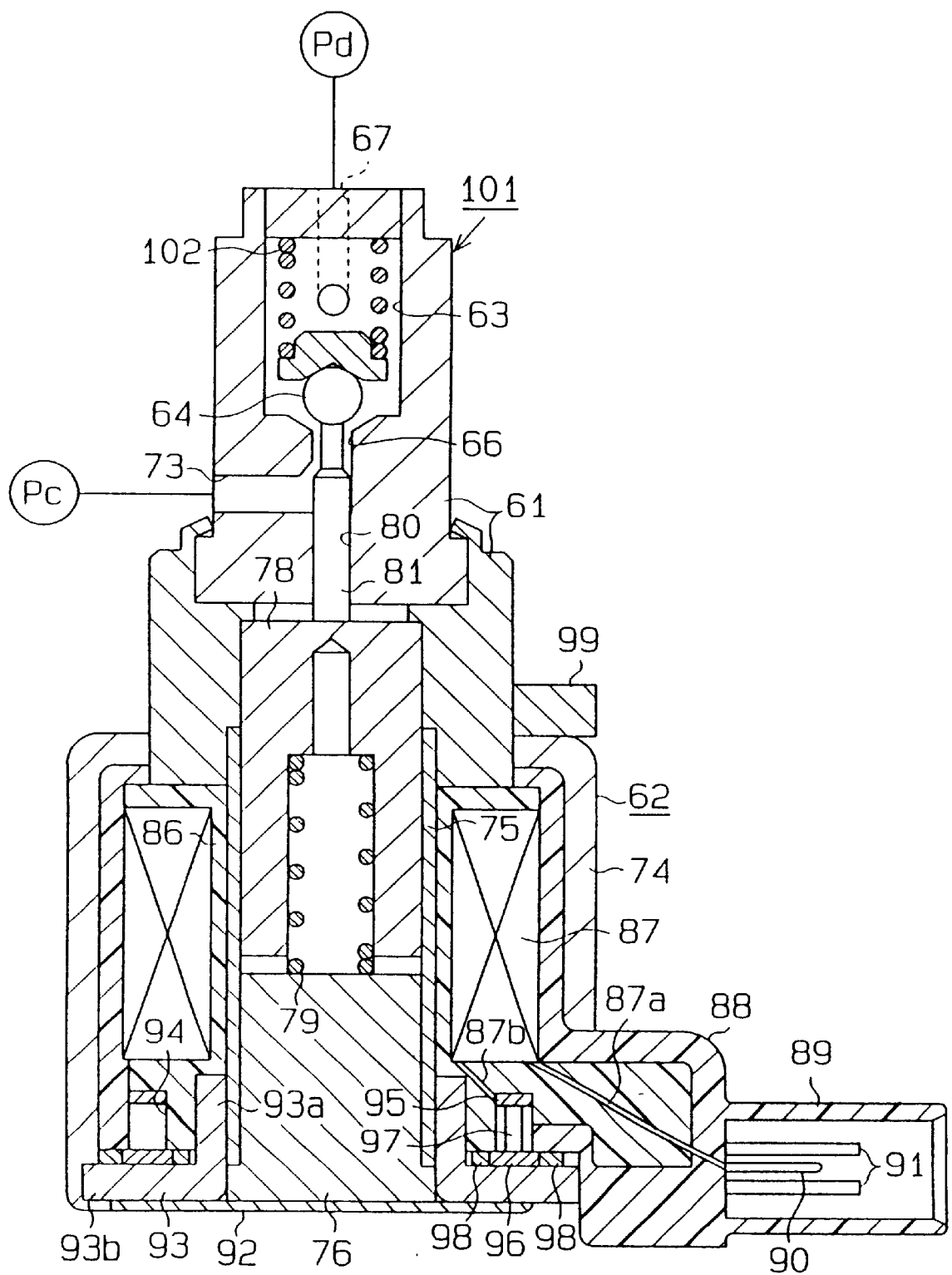
FIG. 8 is a cross-sectional view illustrating a control valve according to a second embodiment of the present invention.
Figure 9:
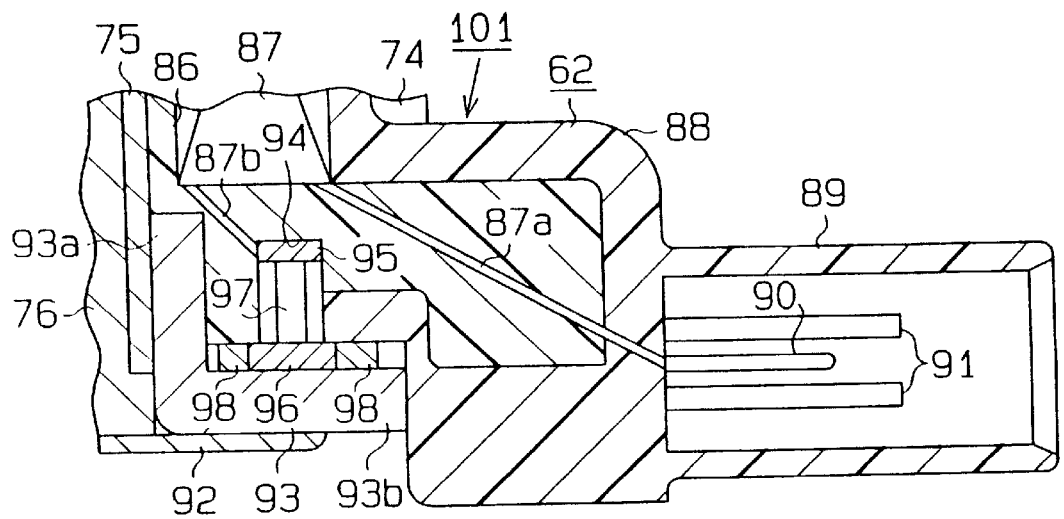
FIG. 9 is an enlarged partial cross-sectional view illustrating the control valve of FIG. 8.
Figure 10:
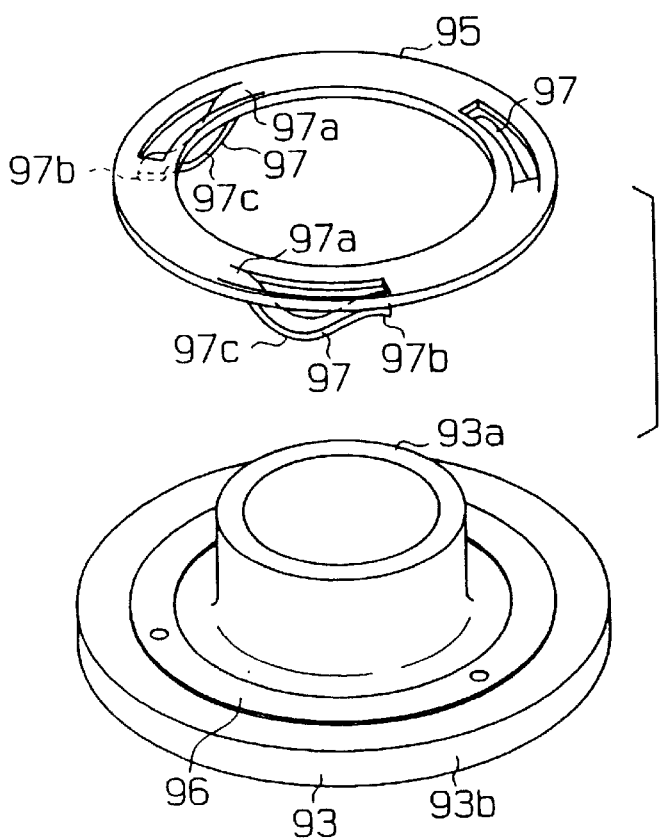
FIG. 10 is an exploded perspective view illustrating a pair of connector plates.

Unlike the control valve 49, the control valve 101 illustrated in FIGS. 8–10 has no pressure sensing member 68 or bellows 70. The valve 101 has a valve chamber 63 in a valve housing 61. A valve body 64 is housed in the valve chamber 63. A spring 102 urges the valve body 64 toward a valve hole 66, or in a direction closing the valve hole 66. A port 67 is formed in the valve chamber 63. The valve chamber 63 is connected with a discharge chamber 38 by the port 67 and a supply passage 48. A port 73 is also formed in the housing 61. The valve chamber 63 is connected with a crank chamber 15 by the port 73 and the supply passage 48.

The valve housing 61 is secured to an actuator 62. A plunger 78 of the actuator 62 is coupled to the valve body 64 by a solenoid rod 81. As in the embodiment of FIGS. 1–7, an insulating cover 88 covers a bobbin 86 and a coil 87 of the actuator 62. A socket 89 extends from the lower periphery of the cover 88. A terminal 90 and a pair of connector guides 91 extend from the bottom surface of the socket 89. A supply lead 87a of the coil 87 extends through the bobbin 86 and the cover 88, and is connected with the terminal 90.

An annular connector plate 95 is secured to the top surface (as viewed in FIG. 8) of a recess 94 formed in the lower surface of the coil bobbin 86. A ground lead 87b of the coil 87 is connected to the first connector plate 95. Contacts 97, the number of which is three in this embodiment, are formed on the lower side of the plate 95. The contacts 97 are integrally formed with the plate 95 by puncing, as best viewed in FIG. 10. A base 93 is attached to the inner side of a lid 92. An annular connector plate 96 is located on a flange 93b of the base 93. Gaskets 98 are located inside and outside of the second plate 96. A middle portion 97c of each contact 97 is pressed against the second plate 96. In this state, the contacts 97 are elastically deformed and a free end 97b of each contact 97 contacts the first plate 95. The ground lead 87b of the coil 87 is electrically connected with the outer casing 74 through the first connector plate 95, the contacts 97, the second connector plate 96, the base 93 and the lid 92.

In addition to the advantages of the embodiment of FIGS. 1–7, the embodiment of FIGS. 8–10 has advantage that the contacts 97 are integrally formed with the first connector plate 95 by punching. This simplifies the structure of the control valve 101 thereby reducing the manufacturing cost.

The illustrated embodiments may be modified as follows. The following constructions have the same advantages as the illustrated embodiments.

In the control valve 49, the contacts 97 may be welded to the first connector plate 95.

In the control valve 101 the contacts 97 may be integrally punched in the second connector plate 96.

In the control valves 49 and 101, the number of the contacts 97 may be changed, for example, to two, four, five or six.

In the control valve 49 and 101, the contacts 97 may be alternately formed on the first plate 95 and on the second plate 96.

What is claimed is:

1. A control valve comprising:
   a valve housing, the valve housing including:
      a first passage;
      a second passage;
      a valve hole to connect the first passage and the second passage; and
      a valve chamber;
   a valve body housed in the valve chamber, wherein the control valve controls a flow of fluid between the first passage and the second passage by selectively opening and closing the valve hole with the valve body;
   an actuator that is attached to the valve housing to actuate the valve body, wherein the actuator includes a casing, and wherein the casing is electrically connected with the valve housing;
   a bobbin made of an electrical insulating material, wherein the bobbin is accommodated in the casing;
   a coil wound about the bobbin, wherein the coil has a ground end and a supply end;
   a first connector plate contacting the bobbin, wherein the ground end of the coil is connected to the first connector plate;
   an electricity supply terminal formed in the casing, wherein the supply end of the coil is connected to the supply terminal;
   a second connector plate electrically connected to the casing, wherein the second connector plate faces the first connector plate; and
   a plurality of contacts located between the first connector plate and the second connector plate to electrically connect the connector plates, wherein the contacts are secured to one of the first and second connector plates and contact the other connector plate.

2. The control valve according to claim 1, further comprising a conductive bracket attached to the valve housing.

3. The control valve according to claim 1, wherein the contacts are equally spaced apart.

4. The control valve according to claim 1, wherein the contacts generally have a cross-sectional shape like that of a bell, each contact having a proximal end fixed to the first connector plate, a distal end separated from the first connector plate and a raised middle portion located between the proximal end and the distal end, and wherein the middle portion contacts the second connector plate.

5. The control valve according to claim 1, wherein the first and second connector plates are annular.

6. The control valve according to claim 5, further comprising a pair of gaskets, wherein one gasket is located radially inside and one is located radially outside of the first connector plate, wherein the gaskets are held against the bobbin.

7. The control valve according to claim 1, wherein a surface treatment is applied to one of the first and second connector plates to give the connector plate stable electric resistance characteristics against temperature changes.

8. The control valve according to claim 7, wherein the surface treatment is either silver plating or tin plating.

9. A compressor comprising:
   a housing including a suction chamber, a discharge chamber and a crank chamber;
   a rotary shaft supported by the housing;
   a rotor rotating integrally with the rotary shaft in the crank chamber;
   a cam plate tiltably supported on the rotary shaft in the crank chamber;

a hinge mechanism for coupling the rotor with the cam plate;

a cylinder bore defined in the housing;

a piston reciprocally housed in the cylinder bore, wherein rotation of the rotary shaft is converted into reciprocation of the piston by the rotor, the hinge mechanism and the cam plate, and wherein the reciprocation of the piston draws refrigerant into the cylinder bore through the suction chamber, and wherein refrigerant is compressed in the cylinder bore and is discharged to the discharge chamber;

a suction passage defined in the housing to introduce refrigerant into the suction chamber;

a shutter moving in accordance with inclination of the cam plate to open and to close the suction passage;

a supply passage connecting the crank chamber with the discharge chamber;

a control valve for opening and closing the supply passage, wherein the control valve comprises:

a valve housing having a valve chamber and a valve hole, wherein the valve hole and the valve chamber are connected with the supply passage;

a valve body housed in the valve chamber, wherein the valve body selectively opens and closes the valve hole to control flow of refrigerant in the supply passage;

an actuator attached to the valve housing to actuate the valve body, wherein the actuator includes a casing, and wherein the casing is electrically connected with the valve housing;

a bobbin made of an electrical insulating material, wherein the bobbin is accommodated in the casing;

a coil wound about the bobbin, wherein the coil has a ground end and a supply end;

a first connector plate contacting the bobbin, wherein the ground end of the coil is connected to the first connector plate;

an electricity supply terminal formed in the casing, wherein the supply end of the coil is connected to the supply terminal;

a second connector plate electrically connected to the casing, wherein the second connector plate faces the first connector plate; and a plurality of contacts located between the first connector plate and the second connector plate to electrically connect the connector plates, wherein the contacts are secured to one of the first and second connector plates and contact the other connector plate.

10. The compressor according to claim 9, wherein the control valve comprises a conductive bracket attached to the valve housing, wherein the control valve is attached to the compressor by the bracket.

11. The compressor according to claim 9, wherein the contacts are equally spaced apart.

12. The compressor according to claim 9, wherein the contacts have a cross-sectional shape like that of a bell, wherein each contact has a proximal end fixed to the first connector plate, a distal end separated from the first connector plate and a raised middle portion located between the proximal end and the distal end, and wherein the middle portion contacts the second connector plate.

13. The compressor according to claim 9, wherein the first and second connector plates are annular.

14. The control valve according to claim 13, further comprising a pair of gaskets (98), wherein one gasket is located radially inside and one is located radially outside of the first connector plate, wherein the gaskets are held against the bobbin (86).

15. The compressor according to claim 13, wherein the control valve further comprises an electrical insulating member that surrounds the bobbin and the coil.

16. The compressor according to claim 9, wherein a surface treatment is applied to one of the first and second connector plates to give the connector plate stable electric resistance characteristics against temperature changes.

17. The compressor according to claim 16, wherein the surface treatment is either silver plating or tin plating.

18. A control valve comprising:

a valve housing;

a valve chamber within the housing;

a valve body located in the valve chamber, wherein the control valve controls a flow of fluid through the valve chamber by selectively opening and closing the valve hole with the valve body;

an actuator that is attached to the valve housing to actuate the valve body, wherein the actuator includes a casing, and wherein the casing is electrically connected with the valve housing;

a bobbin made of an electrical insulating material, wherein the bobbin is accommodated in the casing;

a coil wound about the bobbin, wherein the coil has a ground end and a supply end;

a first connector plate in close proximity to the bobbin, wherein the ground end of the coil is connected to the first connector plate;

an electricity supply terminal formed in the casing, wherein the supply end of the coil is connected to the supply terminal;

a second connector plate facing and spaced apart from the first connector plate, wherein the second connector plate is electrically connected to the casing; and a plurality of flexible contacts located between the first connector plate and the second connector plate to electrically connect the connector plates, wherein the contacts are secured to one of the first and second connector plates and contact the other connector plate.

* * * * *

UNITED STATES PATENT AND TRADEMARK OFFICE
CERTIFICATE OF CORRECTION

PATENT NO. : 6,036,447
DATED : March 14, 2000
INVENTOR(S) : Masahiro Kawaguchi et al.

It is certified that error appears in the above-identified patent and that said Letters Patent is hereby corrected as shown below:

<u>Title page,</u>
Item [75] Inventors, please change "Ken Suito" to -- Ken Suitou --.

Signed and Sealed this

Twelfth Day of March, 2002

Attest:

Attesting Officer

JAMES E. ROGAN
Director of the United States Patent and Trademark Office